(No Model.)
J. WALKER.
PROCESS OF PURIFICATION OF HOPS FOR BREWING PURPOSES.
No. 244,695.          Patented July 19, 1881.
*Fig. 1.*
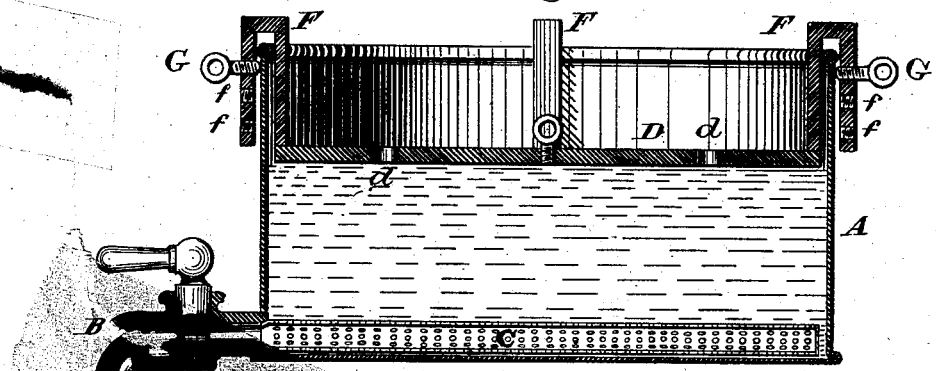
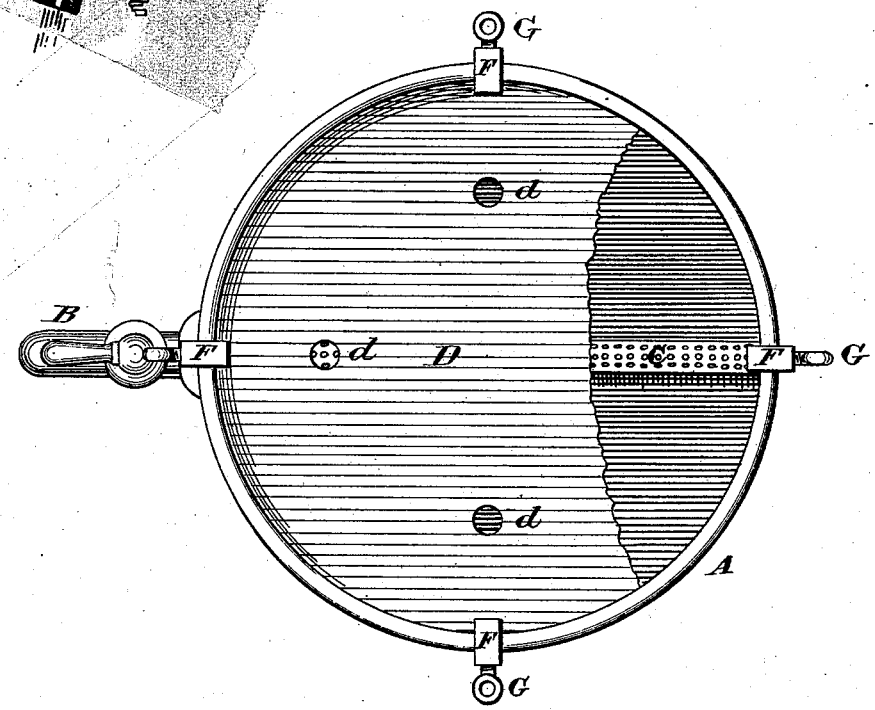
*Fig. 2.*
Attest
Harry E. Knight
L. H. Hopkins
Inventor
James Walker
By Knight Bros. Attys.

UNITED STATES PATENT OFFICE.

JAMES WALKER, OF CINCINNATI, OHIO.

PROCESS OF PURIFICATION OF HOPS FOR BREWING PURPOSES.

SPECIFICATION forming part of Letters Patent No. 244,695, dated July 19, 1881.

Application filed March 2, 1881. (No model.)

*To all whom it may concern:*

Be it known that I, JAMES WALKER, of Cincinnati, in the county of Hamilton and State of Ohio, have invented a new and useful Process for Purification of Hops for Brewing Purposes, of which the following is a specification.

From a period but little subsequent to gathering, hops are liable to greater or less deterioration, which is more or less rapid and extensive, according to the condition of the crop at the time of gathering, favorable or unfavorable atmospheric conditions, lapse of time, and other circumstances. Such decaying portions impart, it is very well known, a very prejudicial flavor to the wort and affect deleteriously the market value of the ale or beer by giving it a musty or disagreeable taste, and detracting seriously from its keeping qualities, such tainted beer being, it is well known, liable to run into acetic fermentation. An astonishingly small fraction of musty or decaying flowers will, as brewers well know, spoil an entire brew.

I have found that all hops used in brewing can be benefited, and that old or damaged hops can be completely cured by the simple expedient of steeping or immersing for a proper period in water which is preferably of about the temperature of 100° Fahrenheit.

I have discovered in practice that while the resinous covering of the sound hops protects them from the water by resisting saturation, the same water freely penetrates the unsound portions and removes the ammoniacal and other deleterious gases and mustiness therefrom. For this purpose I provide the apparatus represented in the accompanying drawings, in which—

Figure is a vertical section; Fig. 2, a top view with a portion of the float or cover broken away.

A represents a tub, tank, or other vessel which is open at top and is of any suitable form, capacity, and material.

At or near the tank-floor is a discharge-faucet, B, that communicates with the interior of the tank through a perforated pipe or trunk, C.

D is a floating head or cover, preferably perforated as at d, and adapted for ready insertion within or removal from the vessel.

F are stops or gages preferably adjustable, and having orifices f and set-screws G, which enable them to be affixed at any desired height upon the tank-wall, so as limit the ascent of the float or cover D, in the manner shown in Fig. 1.

A perforated false bottom may be employed, instead of the pipe C, but I prefer the pipe, because I find that the breaking of the mass of wilted hops over it insures a ready escape for the water in the act of drainage.

For tanks of large dimensions the float may be composed of several sections.

My process is as follows: Having closed the faucet B, I introduce into the tank water in quantity sufficient to cover the pipe C. I then put in enough hops to form a stratum or layer of about six inches deep, more or less. Even cold water is beneficial; but I prefer water of such a moderate warmth as will readily permeate the decayed portions without at all affecting the sound ones. With this object in view I employ water at about blood heat, or, more accurately, at about 90° Fahrenheit in summer and 110° Fahrenheit in winter, with corresponding intermediate temperatures during the intervening seasons. I then insert the float or cover D and apply the stops, which are attached at such height as to arrest the float at the point or level desired. More tepid water is then added until the float is submerged, and is left standing until the water ceases to be turbid. The water is then discharged by opening of the faucet. The requisite duration of steeping or immersion may be twelve hours or less, according to the condition of the hops and other circumstances. The water having been drawn off, the hops are forthwith removed to the copper or brew kettle, for use in the usual way.

Having thus described my invention, the following is what I claim as new therein and desire to secure by Letters Patent:

The mode or process of purifying hops for brewing purposes—to wit., by steeping the hops in water at or approximating a temperature of 100° Fahrenheit until the supernatant liquor ceases to be turbid, then drawing off the water, and finally removing the thus purified hops direct to the brew-kettle, substantially as set forth.

In testimony of which invention I hereunto set my hand.

JAMES WALKER.

Attest:
GEO. H. KNIGHT,
SAML. S. CARPENTER.